United States Patent
Young et al.

(10) Patent No.: US 7,775,540 B2
(45) Date of Patent: Aug. 17, 2010

(54) NON-ROTATING BICYCLE WHEEL DISPLAY DISK

(76) Inventors: Scott James Young, 1111 Osage St., Ste. 9, Denver, CO (US) 80204; Mark Eugene Young, 8581 Santa Monica Blvd., #495, West Hollywood, CA (US) 90069; Todd Harrison Hutcheson, 410 W. 242th St., No. 2E, New York, NY (US) 10011

( * ) Notice: Subject to any disclaimer, the term of this patent is extended or adjusted under 35 U.S.C. 154(b) by 0 days.

(21) Appl. No.: 12/054,256

(22) Filed: Mar. 24, 2008

(65) Prior Publication Data
US 2008/0272643 A1    Nov. 6, 2008

Related U.S. Application Data

(63) Continuation of application No. 11/066,420, filed on Feb. 25, 2005, now Pat. No. 7,347,439.

(60) Provisional application No. 60/547,467, filed on Feb. 25, 2004, provisional application No. 60/547,472, filed on Feb. 25, 2004.

(51) Int. Cl.
*B62J 9/00* (2006.01)
*G09F 21/04* (2006.01)
*B60B 7/00* (2006.01)

(52) U.S. Cl. .................. 280/288.4; 40/587; 301/37.25; 301/37.41; 301/37.106; 301/37.109

(58) Field of Classification Search .............. 280/288.4, 280/152.1, 152.2, 152.3, 852, 160, 160.1; 40/587; 301/37.105, 37.25, 37.41, 37.106, 301/37.109
See application file for complete search history.

(56) References Cited

U.S. PATENT DOCUMENTS

| | | | |
|---|---|---|---|
| 1,478,475 A | 12/1923 | Jago et al. |
| 2,548,070 A | 4/1951 | Ryan |
| 2,869,262 A | 1/1959 | Lucas |
| 3,004,798 A | 10/1961 | Tylle |
| 3,103,369 A | 9/1963 | Gaines et al. |
| 3,602,550 A | 8/1971 | Patane et al. |

(Continued)

OTHER PUBLICATIONS

Sharp, Archibald; Bicycles and Tricycles; Book; 1977; pp. 232, 245, 346, 433; Dover Books; ISBN 0-486-42987-3.

(Continued)

*Primary Examiner*—Lesley D Morris
*Assistant Examiner*—Marc A Scharich
(74) *Attorney, Agent, or Firm*—The Eclipse Group LLP

(57) ABSTRACT

The present invention describes a non-rotating bicycle wheel display assembly that remains absolutely upright in relation to the rotation of a bicycle wheel and in relation to a parked bicycle wheel. The invention consists of a pair of disk assemblies mounted to both sides of a conventional bicycle wheel and in turn, to the front and rear of a bicycle frame. The disk assemblies are manufactured of a light weight inexpensive material that is formed to the convex shape of an outer surface of the bicycle wheel and includes a bearing assembly made of a high density, self lubricating plastic. A plastic retaining mechanism is secured to an outer disk and a bicycle frame member to hold the outer disk in an upright position at all times whether the bicycle is in motion or stationary.

14 Claims, 6 Drawing Sheets

U.S. PATENT DOCUMENTS

| | | | |
|---|---|---|---|
| 4,202,582 A | 5/1980 | Seitman |
| 4,280,293 A | 7/1981 | Kovalenko et al. |
| 4,418,962 A | 12/1983 | Schaffer |
| 4,660,893 A | 4/1987 | Huntzinger |
| 4,678,239 A | 7/1987 | Matsushita |
| 4,682,821 A | 7/1987 | Strazis |
| D293,233 S | 12/1987 | Berg |
| 4,712,838 A | 12/1987 | Berg et al. |
| 4,729,604 A | 3/1988 | Dietz |
| 4,836,615 A | 6/1989 | Berg et al. |
| 4,969,693 A | 11/1990 | Molson |
| 4,978,174 A | 12/1990 | Nosler |
| 5,131,727 A | 7/1992 | Johnson |
| 5,330,688 A | 7/1994 | Downs |
| 5,490,342 A | 2/1996 | Rutterman et al. |
| 5,588,715 A | 12/1996 | Harlen |
| 5,603,553 A | 2/1997 | Klieber et al. |
| 5,659,989 A | 8/1997 | Hsiao et al. |
| 5,903,224 A | 5/1999 | Reynolds |
| 5,957,542 A | 9/1999 | Boothe et al. |
| 6,120,104 A | 9/2000 | Okamoto et al. |
| 6,164,678 A | 12/2000 | Fryer |
| 6,203,391 B1 | 3/2001 | Murasko |
| 6,520,669 B1 | 2/2003 | Chen et al. |
| 6,568,110 B2 | 5/2003 | Lee et al. |
| 6,793,294 B2 | 9/2004 | Shih |
| 6,942,302 B2 | 9/2005 | Osterlund et al. |
| 7,347,439 B2 | 3/2008 | Young et al. |
| 2007/0222179 A1 | 9/2007 | Will et al. |

OTHER PUBLICATIONS

Buckeye Fasteners; Screws; Feb. 12, 2008; GW Weld Screw.
Buckeye Fasteners; Nuts; Feb. 3, 2008; RD Weld Nut.

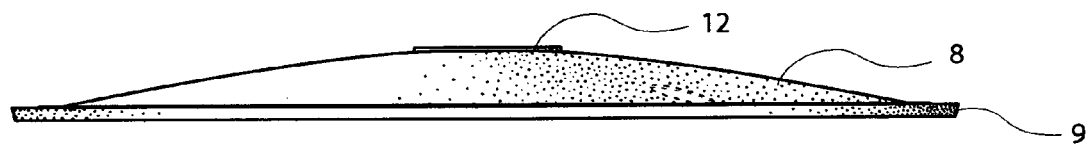
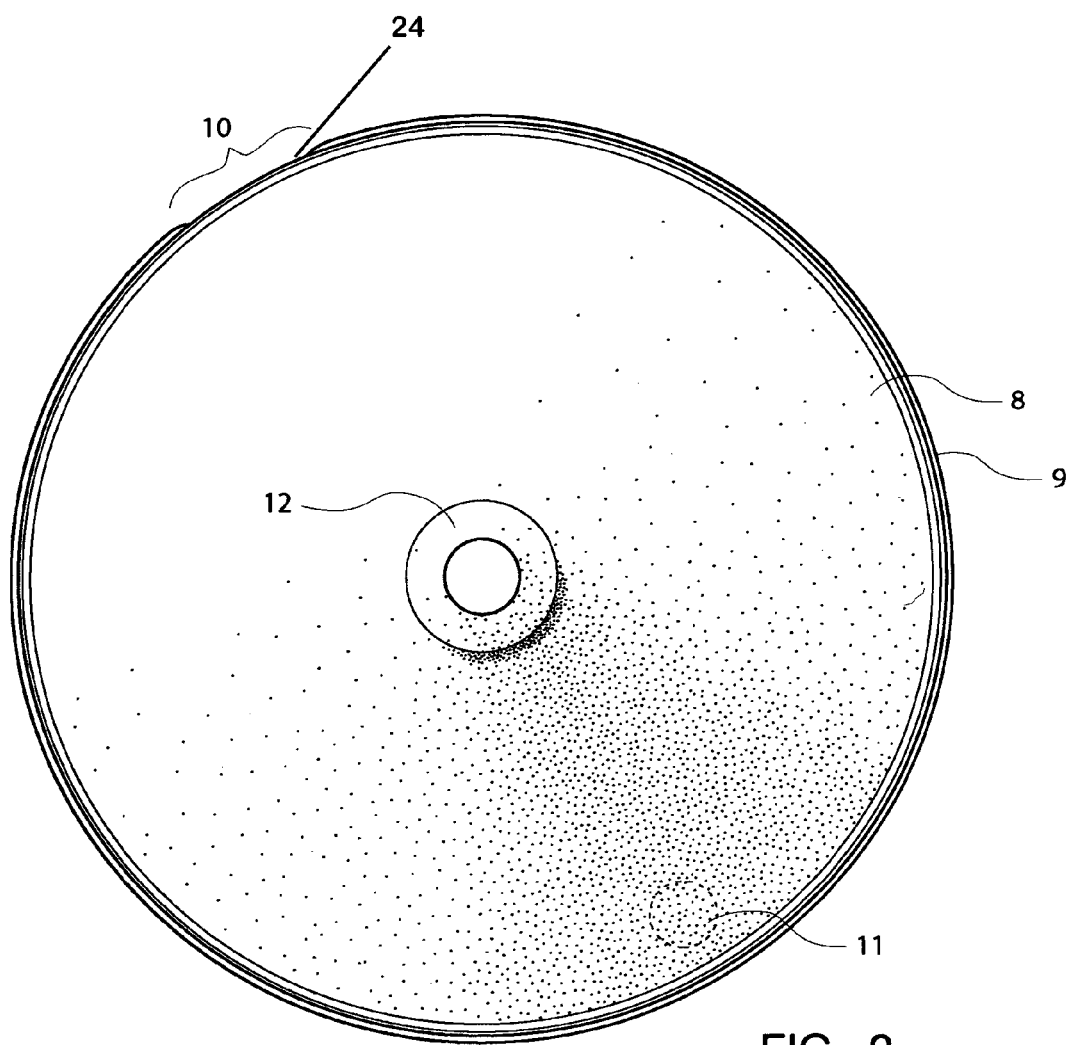

NON-ROTATING BICYCLE WHEEL DISPLAY DISK

CROSS REFERENCE TO RELATED APPLICATIONS

This application is a continuation of U.S. application Ser. No. 11/066,420, filed Feb. 25, 2005 now U.S. Pat. No. 7,347,439, which claims the benefit of U.S. Provisional Patent Application 60/547,467 filed Feb. 25, 2004 and U.S. Provisional Patent Application 60/547,472 filed Feb. 25, 2004.

BACKGROUND OF INVENTION

The present invention relates generally to a pair of bicycle wheel covers, and more particularly, to a pair of lightweight non-rotating bicycle wheel display assemblies that remain absolutely upright in relation to the rotation of a bicycle wheel and in relation to a parked bicycle wheel.

Bicycles are a popular mode of transportation and recreation. As their main means of use is out of doors, this creates a vast commercial opportunity as an advertising display medium. Advertising on bicycles is not a new concept nor are wheel covers.

Wheel display assemblies or "shrouds" on bicycles have been used for aerodynamics, safety and aesthetic purposes. The problem arriving with this type of display is that it is not readable while the bicycle wheel is in motion. Additionally, the display is inevitably not upright after the bicycle has been parked.

The use of counterweights to inhibit the rotation of wheel display disks or covers are known on motor vehicles, but is ineffective in many ways regarding a bicycle application. A bicycle requires balance of the wheels, frame, and rider and the counterweights will fight against this and can result in a very dangerous situation. Bicycles need to be light weight. Further, spacing tolerances on the rear wheel of a bicycle rim are at a minimum due to the rear sprocket, gears, or break and can not accommodate a counterweight. Finally, a counterweighted wheel cover does not remain absolutely still during riding and tends to oscillate at braking, making counterweights inherently unstable.

A need exists in the industry for an improved, lightweight, simple bicycle wheel display assembly that, when mounted to a bicycle wheel and in turn to a bicycle, creates an upright display surface unlike any of the above described inventions.

SUMMARY OF THE INVENTION

The present invention relates generally to a bicycle wheel display assembly, and more particularly, to a pair of lightweight non-rotating bicycle wheel display assemblies that remain absolutely upright in relation to the rotation of a bicycle wheel and in relation to a parked bicycle wheel.

A bicycle wheel display assembly for a wheel of a bicycle according to one implementation of the invention includes a base disk having a circumferential edge and an axis of rotation. The base disk may be secured to the wheel of the bicycle where the wheel has the same axis of rotation as the base disk. Also included in the wheel display assembly is a circular outer disk having an outer surface and an inner surface, where the circular outer disk may be frictionlessly nested within the circumferential edge of the base disk. In addition, at least one retainer member may be used for securing the circular outer disk to a frame of the bicycle such that the circular outer disk remains stationary relative to the frame and the base disk is rotatable relative to the circular outer disk.

To maintain longevity, minimal thickness, correct spacing and centering of the bicycle display assembly, a lightweight, plastic bearing assembly may be included. A large diameter hole in the middle of the base disk and the outer disk, where the bearing assembly resides, accommodates a bicycle's wheel hub and skewer assembly.

Indicia displaying advertising or graphic images is printed on an outer face of the outer disk, or, in the event that the outer disks are manufactured from a clear-substrate, the indicia may be printed on an inner face of the outer disk. Base disks range in diameter to accommodate various wheel sizes from small children's bicycles to adult sized bicycles, so as to completely cover the spoke area of the wheel to the inner rim edge. The outer disks may also be cut to various shapes depicting products or images and in turn the shapes may be attached to an adjustable retaining mechanism or bicycle frame member.

A notch is introduced into an outer edge of each base disk to accommodate a bicycle automobile roof mounting system or an antitheft device opposite of which a hole is located to facilitate adding air to a tire air valve.

DESCRIPTION OF THE DRAWINGS

FIG. 1 is a side elevation view of one side of a bicycle wheel display assembly.

FIG. 2 is a front view of the bicycle wheel display assembly of FIG. 1.

DETAILED DESCRIPTION OF THE INVENTION

Figure 3:
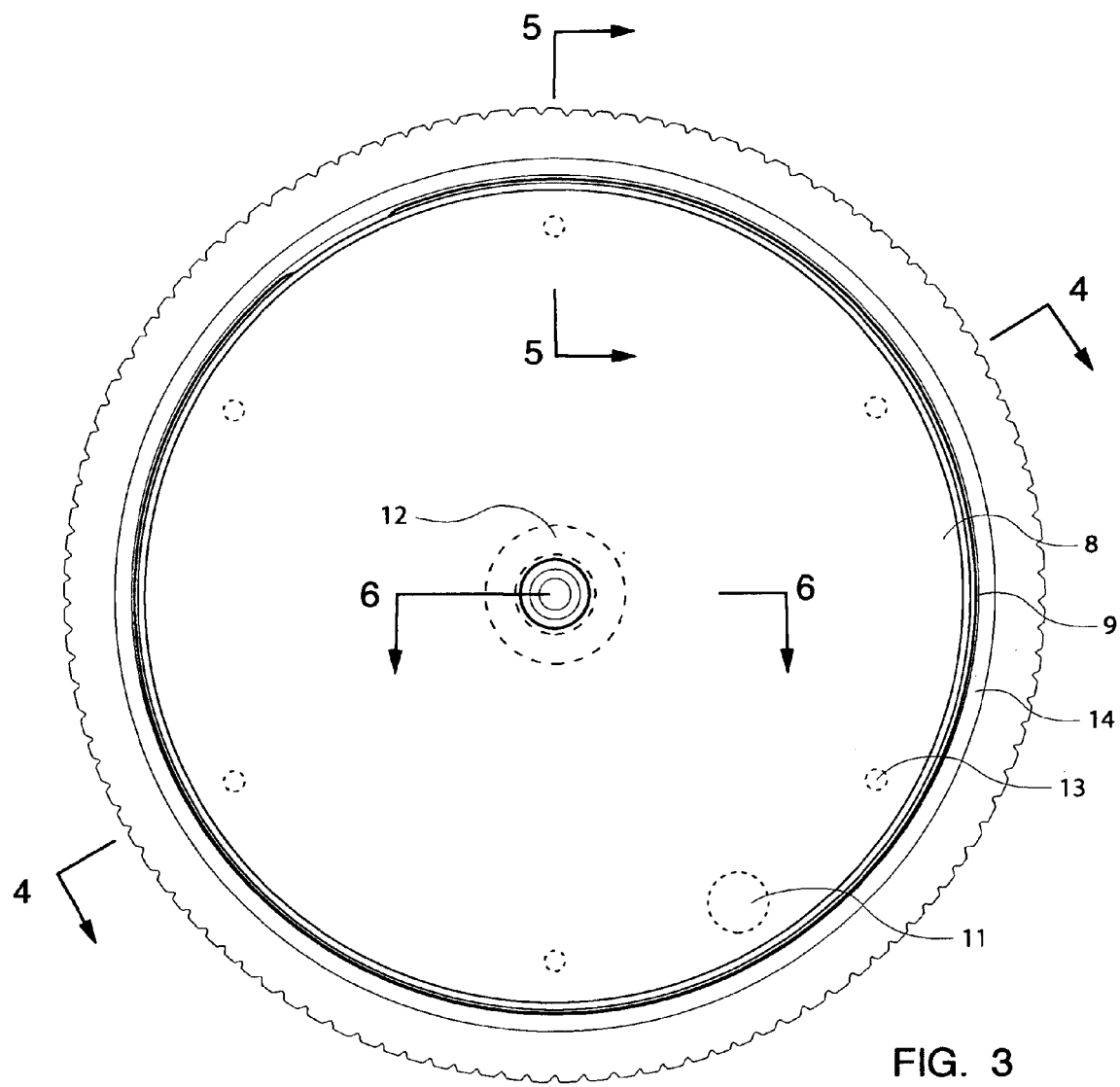
FIG. 3 is a front view of the bicycle wheel display assembly mounted to a typical spoke and wheel assembly.

Turning to FIG. 1, the wheel display assembly includes a circular outer convex disk 8 nested with a raised outer circumference edge of an inner circular base disk 9 with a bearing assembly 12 holding the base disk 9 and the outer convex disk 8 into position, centering both circular disks 8, 9. As seen on FIG. 1, the raised outer circumference edge of the base disk 9 may be formed by turning the outer edge of the base disk 9 upward to nest the outer convex disk 8 into place and protect a leading edge of the outer convex disk 8. The raised edge of the base disk 9 may be interrupted by a slight notch 10 to create an access point for the use of a bicycle automobile roof mounting system or an antitheft device, such as a bicycle lock. A hole 11 may be inset from a periphery of the base disk 9 to facilitate adding air into an air valve stern. The hole 11 may be accessed by slightly lifting the outer convex disk 8 and inserting an air hose.

As further illustrated in FIGS. 1 and 2, the base disk 9 may include an outer retainer ring 24, which may help to prevent the outer convex disk 8 from being pulled out past the base disk 9. The retainer ring 24 may also be included to help keep the outer convex disk 8 centered and in place during bicycle operation, and to help prevent the outer convex disk 8 from buffering.

Moving to FIG. 3, we see the invention mounted to a bicycle wheel and tire assembly designated as 14. The outer convex disk 8 covers a plurality of mounting holes 13 as well as the valve stem access hole 11 discussed above. By keeping the outer surface clean of these components the function of the base disk 9 becomes unseen. The stability of the outer convex disk 8 and its use on a bicycle is unique to the invention.

Figure 4:
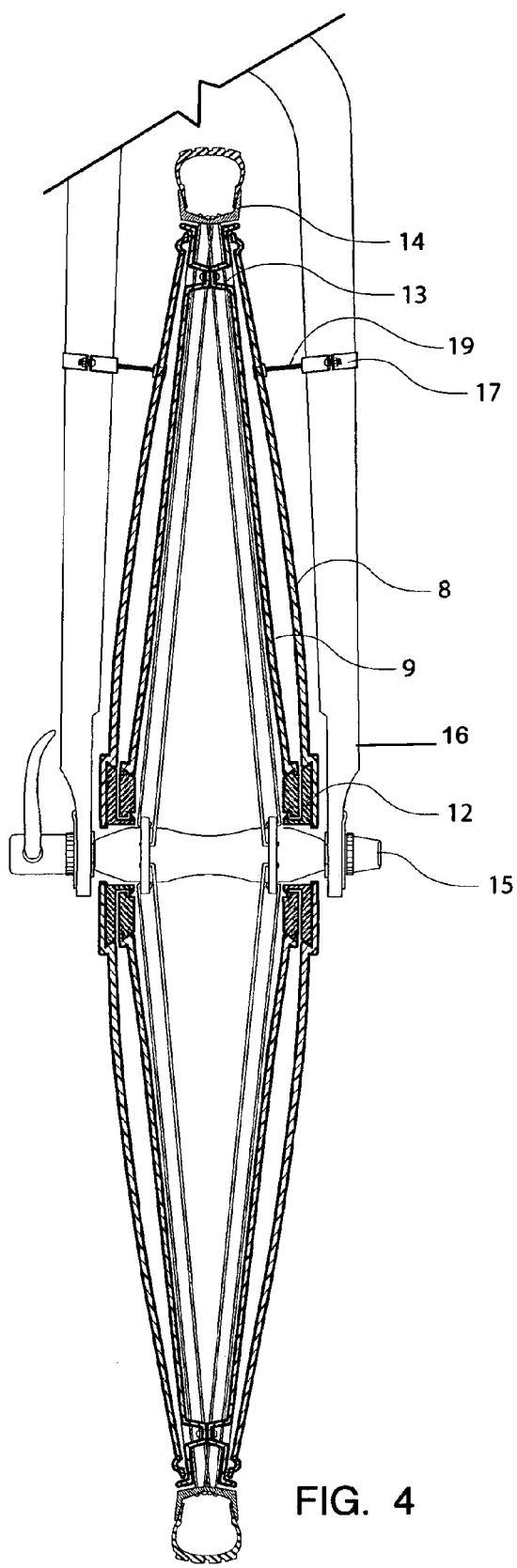
FIG. 4 is a cross-section of a bicycle wheel display assembly mounted to a bicycle frame that in-turn is mounted to a typical spoke and wheel assembly and showing bearing assembly location of the wheel display assembly.

As illustrated in FIG. 4, a cross-section of a bicycle wheel display assembly is mounted to a bicycle frame member 16 that in turn is mounted to a typical spoke and wheel assembly 14 and showing bearing assembly 12 location of the wheel display assembly. The bearing assembly 12 may be constructed of, for example, self lubricating plastic. The bearing assembly 12 may include a female inner portion and a male outer portion, where the male portion is interconnectable with the female inner portion. As shown in FIG. 4, the wheel display assembly may generally include at least one retainer member 19 for securing the circular outer disk 8 to a bicycle frame member 16 such that the circular outer disk 8 remains stationary relative to the bicycle frame and the base disk 9 is rotatable relative to the circular outer disk 8. The retainer member 19 may include, for example, a wrap-around retainer 17 for securing the circular outer disk 8 to the bicycle frame member 16. Alternatively, the retainer member 19 may be wired or welded to the bicycle frame member 16. The retainer member 19 may be configured such that it is able to self-destruct when an outside force is applied to the circular outer disk 8.

Figure 5:
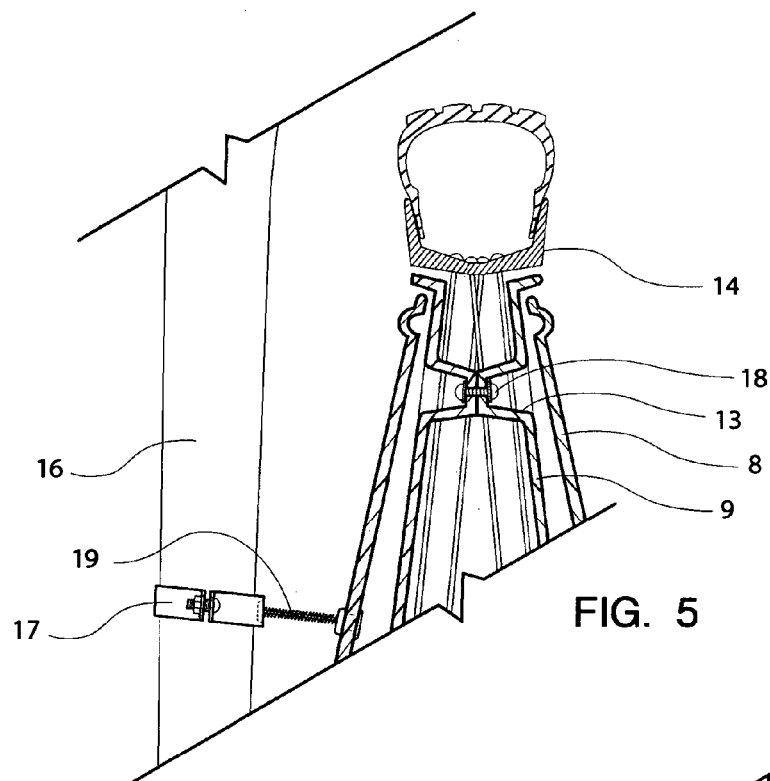
FIG. 5 is a detailed section view of a bicycle wheel display assembly mounted to a typical bicycle spoke and wheel assembly showing the mechanical attachment to a bicycle frame.

FIG. 5 is a detailed section view of a bicycle wheel display assembly mounted to a typical bicycle spoke and wheel assembly 14 showing the mechanical attachment to a bicycle frame member 16. As shown in FIG. 5, the base disk 9 may include a plurality of mounting holes 13 via which the base disk 9 is secured to the wheel of a bicycle. The mounting holes 13 in the base disk 9 may be used to attach the bicycle wheel display assembly to a like assembly via sonic welding, or as shown in FIG. 5, via a suitable mechanical fastener 18.

Figure 6:
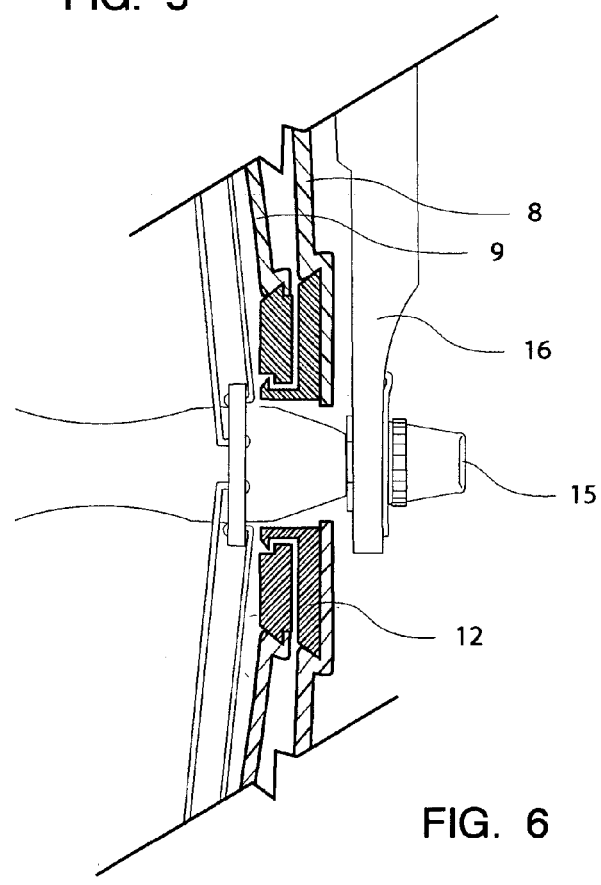
FIG. 6 is a detailed section view of a bicycle wheel display assembly showing the bearing assembly.
Figure 7:
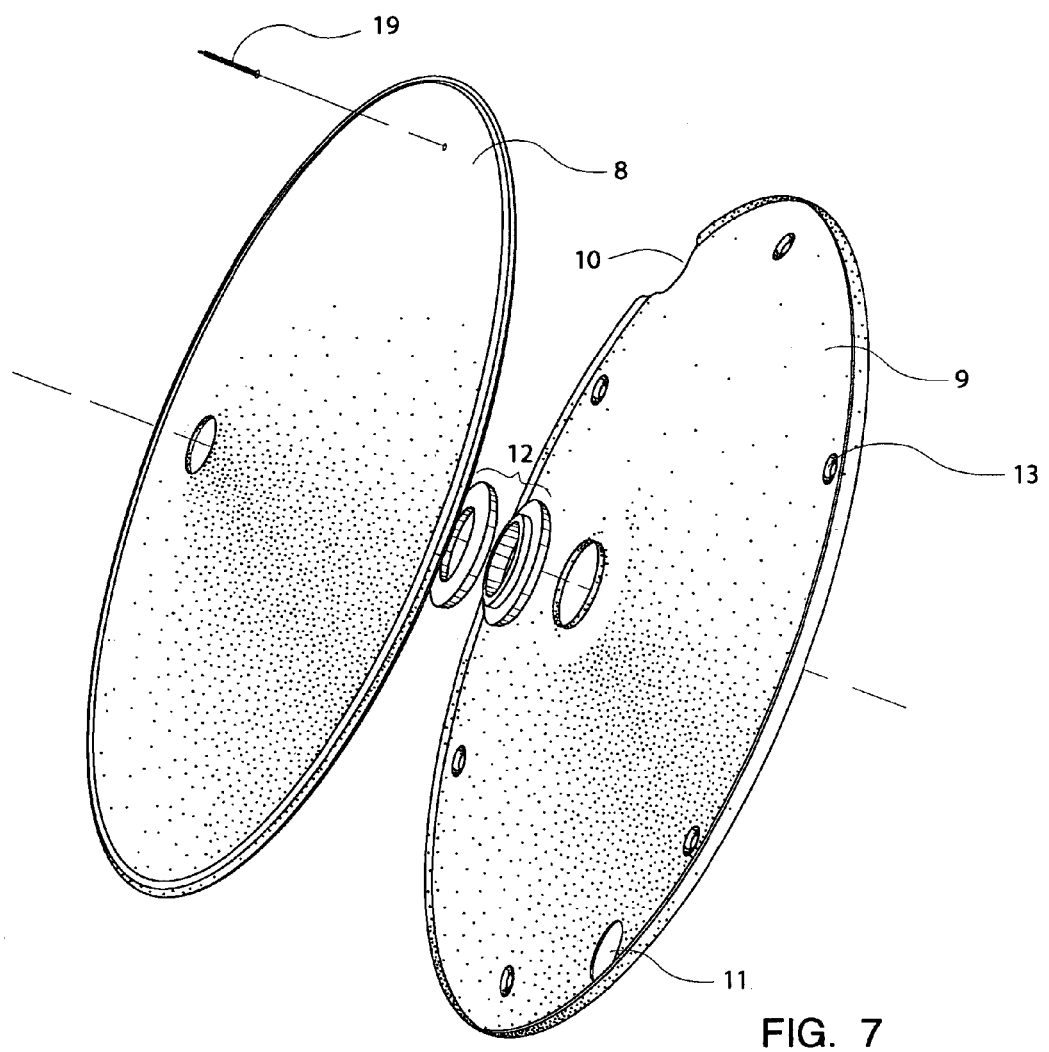
FIG. 7 is an exploded view of a bicycle wheel display assembly showing a base disk, bearing assembly and outer disk.

Referring further to FIG. 7, FIG. 7 illustrates an exploded view of the wheel display assembly of FIG. 4. The wheel display assembly generally includes a base disk 9, having a turned up circumferential edge and a center hole to accept a bicycle wheel hub and skewer 15 (as shown in FIG. 4 and FIG. 6). A plurality of recessed holes 13 to attach to a like assembly via sonic welding or mechanical fasteners is also provided.

A bearing assembly 12 may be molded into the base disk 9 and circular outer convex disk 8 at the time of forming. The bearing assembly 12 may include a female portion and a male outer portion that is interconnectable with the female inner portion as seen again in FIG. 6 and FIG. 7. The bearing assembly 12 enables the circular outer convex disk 8 to turn freely without wear or friction. A retaining mechanism made of PVC may be mechanically fastened to the circular outer convex disk 8 and a bicycle frame member to hold the outer disk 8 in a rigid and upright position making the graphic readable at all times.

The outer convex disk 8 of the invention may include a design printed thereon so as to display advertising or graphic images on the outer face, or the inner face and back wheel mounted disk, in the event that the outer convex disks 8 are manufactured from a clear substrate. Because of the display capability of the disks 8, 9, they may be referred to herein as display disks. Display disks may range in diameter to accommodate various wheel sizes from small children's bicycles to adult sized bicycles, so as to completely cover the spoke area of the wheel to the inner rim edge. The outward facing display disk may also be cut into various shapes depicting products or images and in turn the shapes may be attached to the rigid adjustable retaining mechanism/bicycle frame member.

Figure 8:
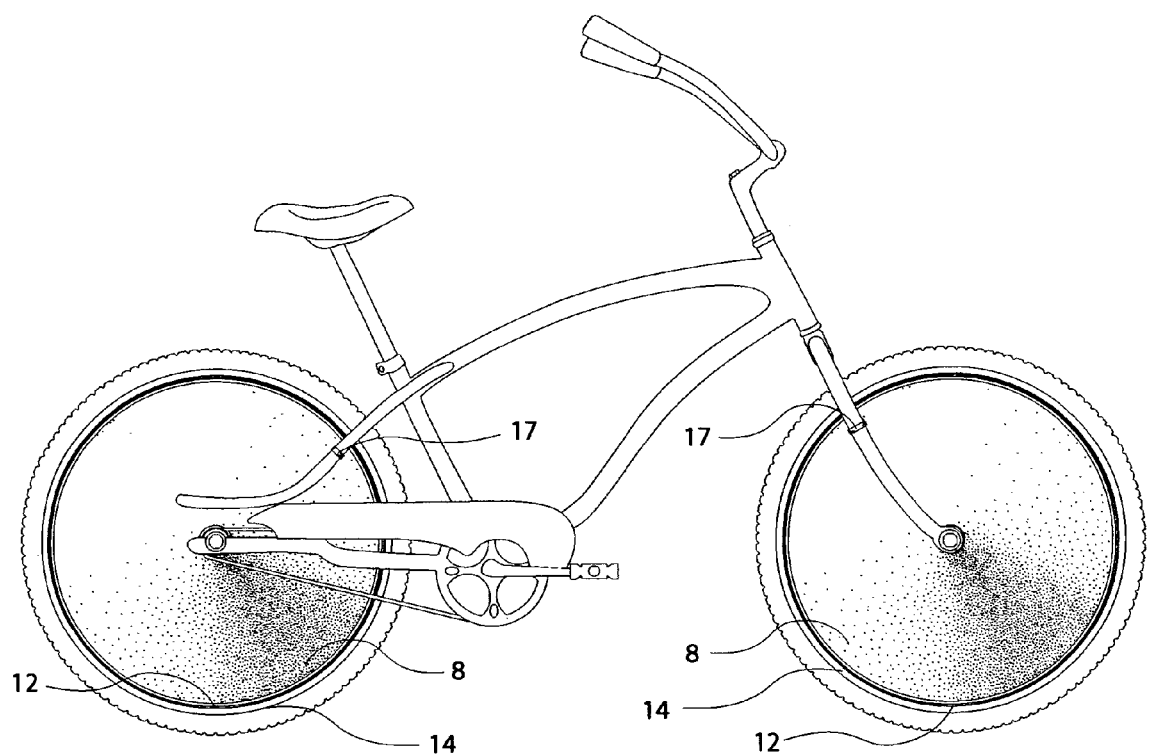
FIG. 8 is an elevation view of a bicycle showing the application of a bicycle wheel display assembly to both the front and rear wheels of the bicycle.

FIG. 8 illustrates a bicycle having the bicycle wheel display assembly described above affixed to both the front and rear wheels of the bicycle.

What is claimed is:

1. A wheel display assembly for a wheel of a bicycle comprising:
    a base disk having a circumferential edge and an axis of rotation, the base disk being secured to the wheel of the bicycle wherein the wheel has the same axis of rotation as the base disk;
    a circular outer disk having an outer surface and an inner surface, the circular outer disk being frictionlessly nested within the circumferential edge of the base disk; and
    at least one retainer member for securing the circular outer disk to a frame of the bicycle such that the circular outer disk remains stationary relative to the frame and the base disk is rotatable relative to the circular outer disk.

2. The wheel display assembly of claim 1 further comprising a bearing assembly for maintaining the base disk and the circular outer disk in position.

3. The wheel display assembly of claim 2 wherein the bearing assembly is made of self lubricating plastic.

4. The wheel display assembly of claim 2 wherein the bearing assembly comprises a female inner portion and a male outer portion, wherein the male outer portion is interconnectable with the female inner portion.

5. The wheel display assembly of claim 1 wherein the base disk includes a plurality of mounting holes via which the base disk is secured to the wheel of the bicycle.

6. The wheel display assembly of claim 1 wherein the base disk includes a valve stem access hole.

7. The wheel display assembly of claim 1 wherein the retainer member is able to self-destruct when an outside force is applied to the circular outer disk.

8. A bicycle comprising:
    a frame;
    at least one wheel mounted to the frame; and
    a wheel display assembly mounted on the at least one wheel, the wheel display assembly comprising:
    a base disk having a circumferential edge and an axis of rotation, the base disk being secured to the wheel of the bicycle wherein the wheel has the same axis of rotation as the base disk;
    a circular outer disk having an outer surface and an inner surface, the circular outer disk being frictionlessly nested within the circumferential edge of the base disk; and
    at least one retainer member for securing the circular outer disk to the frame of the bicycle such that the circular outer disk remains stationary relative to the frame and the base disk is rotatable relative to the circular outer disk.

9. The bicycle of claim 8 further comprising a bearing assembly for maintaining the base disk and the circular outer disk in position.

10. The bicycle of claim 9 wherein the bearing assembly is made of self lubricating plastic.

11. The bicycle of claim 9 wherein the bearing assembly comprises a female inner portion and a male outer portion, wherein the male outer portion is interconnectable with the female inner portion.

12. The bicycle of claim 8 wherein the base disk includes a plurality of mounting holes via which the base disk is secured to the wheel of the bicycle.

13. The bicycle of claim 8 wherein the base disk includes a valve stem access hole.

14. The bicycle of claim 8 wherein the retainer member is able to self-destruct when an outside force is applied to the circular outer disk.

* * * * *